United States Patent [19]

Kiefer

[11] 4,093,762

[45] June 6, 1978

[54] METHOD OF MAKING A HARDCORE HONEYCOMB PANEL AND HONEYCOMB PANEL MADE THEREBY

[76] Inventor: John Kiefer, 713 E. 6th St., New York, N.Y. 10019

[21] Appl. No.: 595,055

[22] Filed: Jul. 11, 1975

Related U.S. Application Data

[63] Continuation-in-part of Ser. No. 465,493, Apr. 30, 1974, Pat. No. 3,895,144, which is a continuation-in-part of Ser. No.351,671, Apr. 16, 1973, abandoned, which is a continuation of Ser. No. 118,216, Feb. 24, 1971, abandoned.

[51] Int. Cl.² .......................... B32B 3/14; B32B 3/20; B32B 5/12

[52] U.S. Cl. .......................................... 428/55; 52/615; 144/314 R; 144/314 A; 144/314 B; 144/316; 156/250; 428/106; 428/157; 428/166; 428/188

[58] Field of Search ................. 428/55, 106, 157, 166, 428/188; 156/250; 144/314 R, 314 A, 314 B, 316; 52/615

[56] References Cited

U.S. PATENT DOCUMENTS

| | | | |
|---|---|---|---|
| 823,843 | 6/1906 | Buyten | 428/106 |
| 2,706,164 | 4/1955 | Hervey | 428/106 |
| 3,333,384 | 8/1967 | Brady | 144/316 |

*Primary Examiner*—Thomas J. Herbert, Jr.
*Assistant Examiner*—R. Eugene Varndell, Jr.
*Attorney, Agent, or Firm*—Hubbell, Cohen, Stiefel & Gross

[57] ABSTRACT

A method of making a hardcore honeycomb panel comprising the steps of providing a multilevel stack of planar boards of grained lumber fastened together and arranged in the stack in step-wise fashion with alternate levels comprising spaced apart board strips forming longitudinal channels in the stack sandwiched between boards having the width of the stack, cutting the stepped stack on a first cut line through the side faces thereof at a predetermined acute angle, such as 12°–30°, between the cut line and the bottom face of the stack and making subsequent coplanar cuts in this stack at predetermined distances from each other for providing a plurality of cut segments whose top, front, bottom and rear faces are rectangular and whose side faces are rhomboidal and which have angular channels therethrough. These cut segments are then sub-divided into a plurality of coplanar pieces which are fastened together to form the honeycomb panel having angular channels therethrough with alternate pieces being inverted 180° about a longitudinal axis through the center of the piece so that each of the piece adjacent end faces for every other one of these pieces of batten-like members forms the predetermined acute angle with the longitudinal axis of the piece whereas the end faces of the alternate pieces each form a predetermined obtuse angle with the longitudinal axis of the piece which is supplementary of the predetermined acute angle. The direction of the grain of each of the obtuse angular related pieces is supplementary to the direction of the grain of each of the acute angular related pieces. Such a hardcore honeycomb panel may be produced by this method and a veneer layer may be fastened to the top and bottom faces of the hardcore honeycomb panel, such as to form a door.

20 Claims, 12 Drawing Figures

FIG. 1.
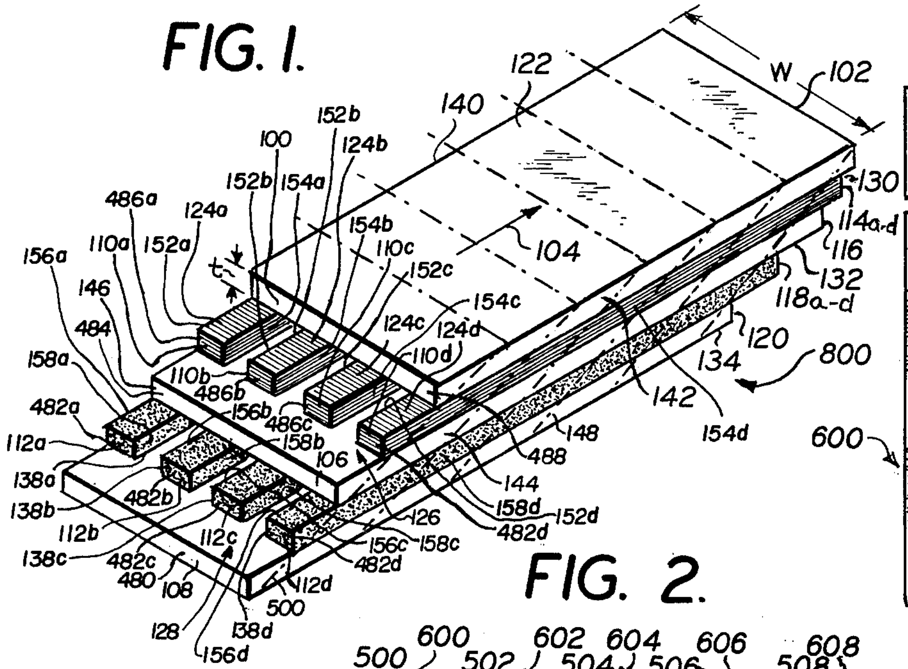
FIG. 3A.
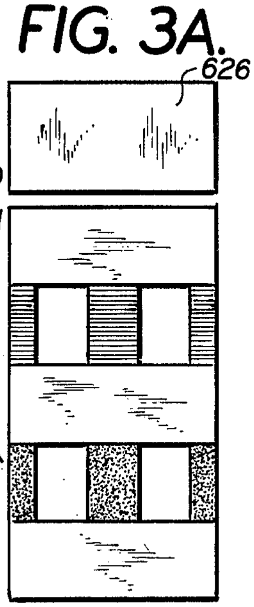
FIG. 3D.
FIG. 2.
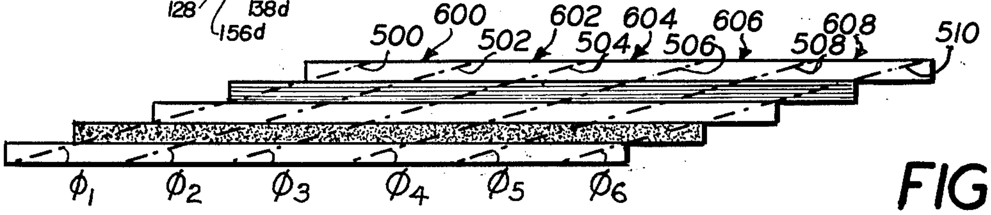
FIG. 3C.
FIG. 3B.
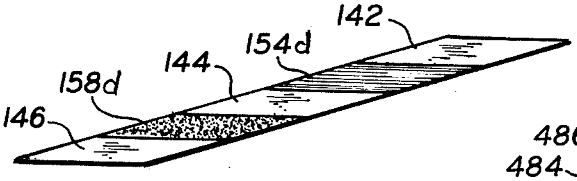
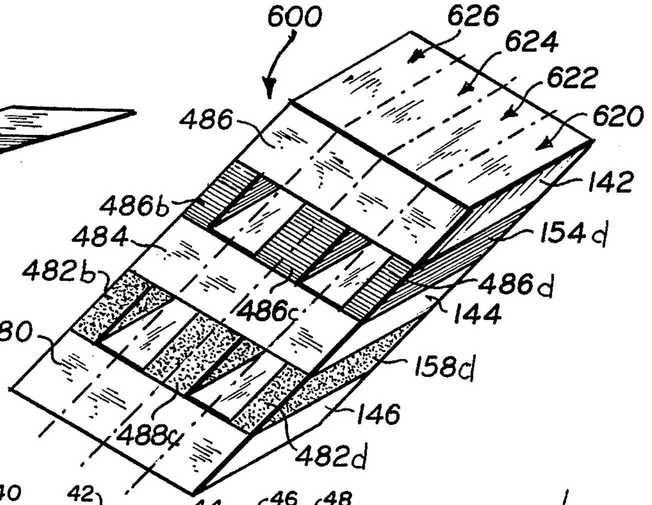
FIG. 4.
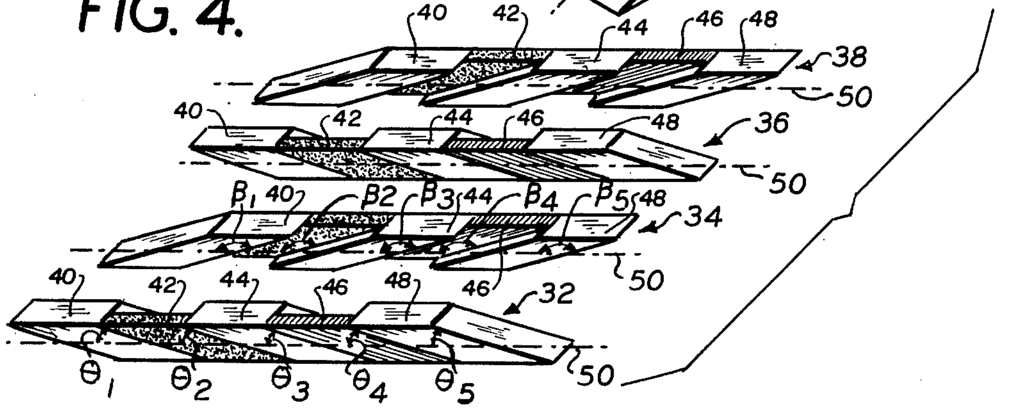

METHOD OF MAKING A HARDCORE HONEYCOMB PANEL AND HONEYCOMB PANEL MADE THEREBY

CROSS REFERENCE TO RELATED APPLICATION

This application is a continuation-in-part of my co-pending U.S. patent application Ser. No. 465,493, filed Apr. 30, 1974, now U.S. Pat. No. 3,895,144 which is a continuation in part of my application, Ser. No. 351,671, filed Apr. 16, 1973, now abandoned, which is a continuation of my application, Ser. No. 118,216, filed Feb. 24, 1971, now abandoned, the contents of all of said applications being hereby incorporated herein by reference.

BACKGROUND OF THE INVENTION

1. Field of the Invention

The present invention relates to hardcore honeycomb panels and methods of making such panels.

2. Description of the Prior Art

Various types of wood decorative or structural members are well known such as disclosed in U.S. Pat. No. 2,578,781 in which diagonal glued plywood board is provided in which bias-grained sheets of veneer are cut at a right angle to their edge into any desired length and two or more pieces cut in this manner are then assembled face to face so that their scissor strip joints and the grain of the wood in each alternate ply crosses at right angles. This plywood does not utilize multi-ply rhomboidal strips. The construction disclosed in this reference is purportedly more economical than conventional rectangular plywood but is not utilizable to obtain a hardcore panel without veneering, which veneering is the basis of the process in this reference. Other such prior art construction requiring the use of a veneer is disclosed in U.S. Pat. No. 1,734,826, the core being cross banded with the veneer in this reference. Other prior art compositions utilizing laminated wood to construct a multi-ply laminate, all of which are different from the invention described herein are disclosed in U.S. Pat. Nos. 2,172,093; 2,389,944; 1,214,382; 3,389,041; 677,800; 800,993; 1,994,204 and 308,184. In addition, prior art hollow doors which normally consist of a picture frame type arrangement having wood veneer on the spaced apart front and back of the door, normally utilize a honeycomb filler, such as corrugated cardboard for filling the interior space in the door. Such doors are utilized in place of more costly solid wood doors to give the same external appearances; however, such hollow doors are not as structurally sound as solid wood doors.

SUMMARY OF THE INVENTION

The present invention relates to a hardcore honeycomb panel and a method of making this panel. The hardcore honeycomb panel comprises a plurality of adjacent batten-like members fastened together in a substantially planar configuration with each of the batten-like members having a top face, an opposed bottom face, a pair of opposed end faces and a pair of opposed side faces, each of the faces being substantially normal to the adjacent face of the batten-like member. Each of these members comprises a fastened plurality of stacked adjacent angular board segments of grained lumber, each of the segments having a top face, an opposed bottom face, a pair of opposed end faces and a pair of opposed side faces with the board segments being stacked along the longitudinal axis of the batten-like member of one end face to the opposed end face. At least a portion of the board segments define angular channels therethrough. The adjacent angular board segmet end faces are fastened together and are substantially parallel to each other with the adjacent angular board segment top, bottom and side faces, respectively. Each of the segment adjacent ends faces for every other one of the fastened batten-like members forms a predetermined acute angle, such as between 12° and 30°, with the longitudinal axis, each of the adjacent end faces comprising the batten-like members adjacent to every other member forming a predetermined obtuse angle with the longitudinal axis which is supplementary to the predetermined acute angle. The grain of each of the segments comprising a given batten-like member preferably all run in the same direction between the top surface and the bottom surface with the direction of the grain on each of the obtuse angular related segments being supplementary to the direction of the grain of each of the acute angular related segments. In making such a hardcore honeycomb panel, a multilevel stack of planar boards of grained lumber are fastened together and arranged in the stack in step-wise fashion with alternate levels comprising spaced apart board strips forming longitudinal channels in the stack sandwiched between boards having the width of the stack. The stack is cut along coplanar cut lines through the side faces thereof at the predetermined acute angle formed between the cut lines and the bottom face of the stack to provide cut portions from the stack which have rectangular top, front, bottom and rear faces and rhomboidal side faces and which have angular channels therethrough. These cut portions are further sub divided into substantially symmetrical segments which comprise the batten-like members which are alternately inverted and fastened together in the manner described above to form the honeycomb panel having angular channels therethrough. A veneer may be fastened to the top and bottom surfaces of the hardcore honeycomb panel such as to form a door.

BRIEF DESCRIPTION OF THE DRAWINGS

FIGS. 1, 2, 3*a*, 3*b*, 3*c*, 3*d*, 4, 5, 6 and 7 are illustrative of the preferred steps in the preferred method of the present invention;

FIG. 7 is illustrative of a preferred embodiment of the hardcore honeycomb panel produced in accordance with this method;

DETAILED DESCRIPTION OF THE PREFERRED EMBODIMENT

Figure 7:
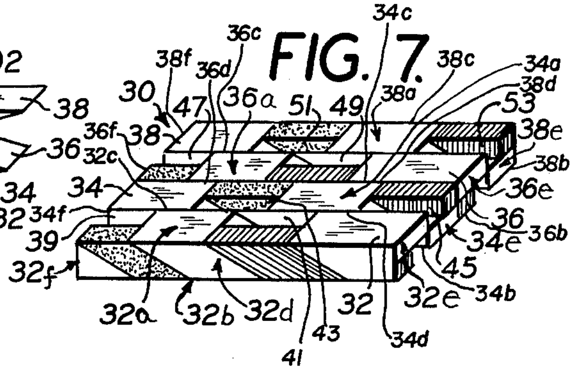

Referring now to the drawings in detail and initially to FIGS. 3*a*, 3*b*, 3*c*, 3*d*, 4, 5, 6 and 7, a preferred embodiment of a hardcore panel, generally referred to by the reference numeral 30, in accordance with the present invention is shown (FIG. 7). As shown and preferred in FIG. 7, the hardcore panel 30 preferably comprises a plurality of adjacent batten-like members, four such members 32, 34, 36 and 38 being shown by way of example in FIG. 7, fastened together, such as preferably with a waterproof resin such as caseine glue, or any other conventional binding adhesive, in a substantially planar configuration, as illustrated in FIG. 7. Each of these batten-like members 32 through 38, preferably has a top face, an opposed bottom face, a pair of opposed side faces, and a pair of opposed end faces, these faces being designated *32a, 32b, 32c, 32d, 32e,* and *32f,* respectively, for member 32; *34a* through *34f,* respectively for member 32; *36a* through *36f,* respectively for member 36; and *38a* through *38f,* respectively for member 38. As shown and preferred in FIG. 7, each of the faces of the batten-like members 32 through 38 is substantially normal to the adjacent faces. The fastening together of the batten-like members 32 through 38 previously described is preferably accomplished by gluing together adjacent side faces of the batten-like members, side face *32c* being fastened to side face *34d,* side face *34c* being fastened to side face *36d* and side face *36c* being fastened to side face *36d* and side face *36c* being fastened to side face *38d* in the arrangement illustrated in FIG. 7. As shown and preferred in FIGS. *3a, 3b, 3c, 3d,* 4, 5, 6 and 7, each of the batten-like members 32 through 38 preferably comprises a fastened plurality of stacked adjacent angular board segments of grained lumber, five such segments 40, 42, 44, 46 and 48 being shown by way of example in FIGS. 4 and 6. As will be described in greater detail hereinafter, each of the batten-like members 32, 34, 36 and 38 preferably includes angular through channels therein defined by the various faces of the adjacent angular board segments comprising the batten-like members so as to form the honeycomb hardcore panel 30. By way of example, member 32 includes angular channels 39 and 41, member 34 includes angular channels 43 and 45, member 36 includes angular channels 47 and 49, and member 38 includes angular channels 51 and 53, with channels 39, 43, 47 and 51 being in segment 42 and channels 41, 45, 49 and 53 being in segment 46 of the angular board segments comprising the batten-like members. These adjacent angular segments are preferably fastened together in the same fashion as adjacent batten-like members are fastened together by gluing with a waterproof resin, such as the casine glue previous mentioned. As shown and preferred, each of the segments 40 through 48 inclusive comprising each of the batten-like members 32 through 38, has a top face, an opposed bottom face, a pair of opposed end faces and a pair of opposed side faces, these faces being designated *40a, 40b, 40c, 40d, 40e* and *40f,* respectively for segment 40; *42a* through *42f,* respectively, for segment 42; *44a* through *44f,* respectively, for segment 44; *46a* through *46f,* respectively, for segment 46; and *48a* through *48f,* respectively, for segment 48. As shown and preferred in FIGS. 6 and 7, these board segments 40 through 48, inclusive, are preferably stacked along the longitudinal axis 50 of the batten-like member, such as batten-like member 32, by way of example, from one end *32f* of the batten-like member 32 to the opposed end face *32e* of the batten-like member 32. As shown and preferred in FIG. 6, segment end faces *40e, 42f, 42e, 44f, 44e, 46f,* and *46e* are parallel to each other, with the adjacent end faces *40e–42f, 42e–44f, 44e–46f, 46e–48f* being fastened together. End faces *40f* and *48e* are preferably normal to the top and bottom surfaces *32a* and *32b* by way of example of the respective batten-like member 32 and are produced in accordance with the preferred method of the present invention to be described in greater detail hereinafter. As is shown and preferred, the top, bottom and side faces of the fastened angular board segments 40 through 48 and the respective batten-like members 32 through 38, are fastened together to provide the planar top and bottom surfaces for the hardcore honeycomb panel 30 having angular through channels therein as well as providing the top, bottom and side faces for the respective batten-like members, with the end faces *32e* and *32f* being provided by cutting end faces *40f* and *48e* off to form a normal or perpendicular end face between the top and bottom faces *32a* and *32b,* by way of example, of the respective batten-like member 32.

Figure 9:
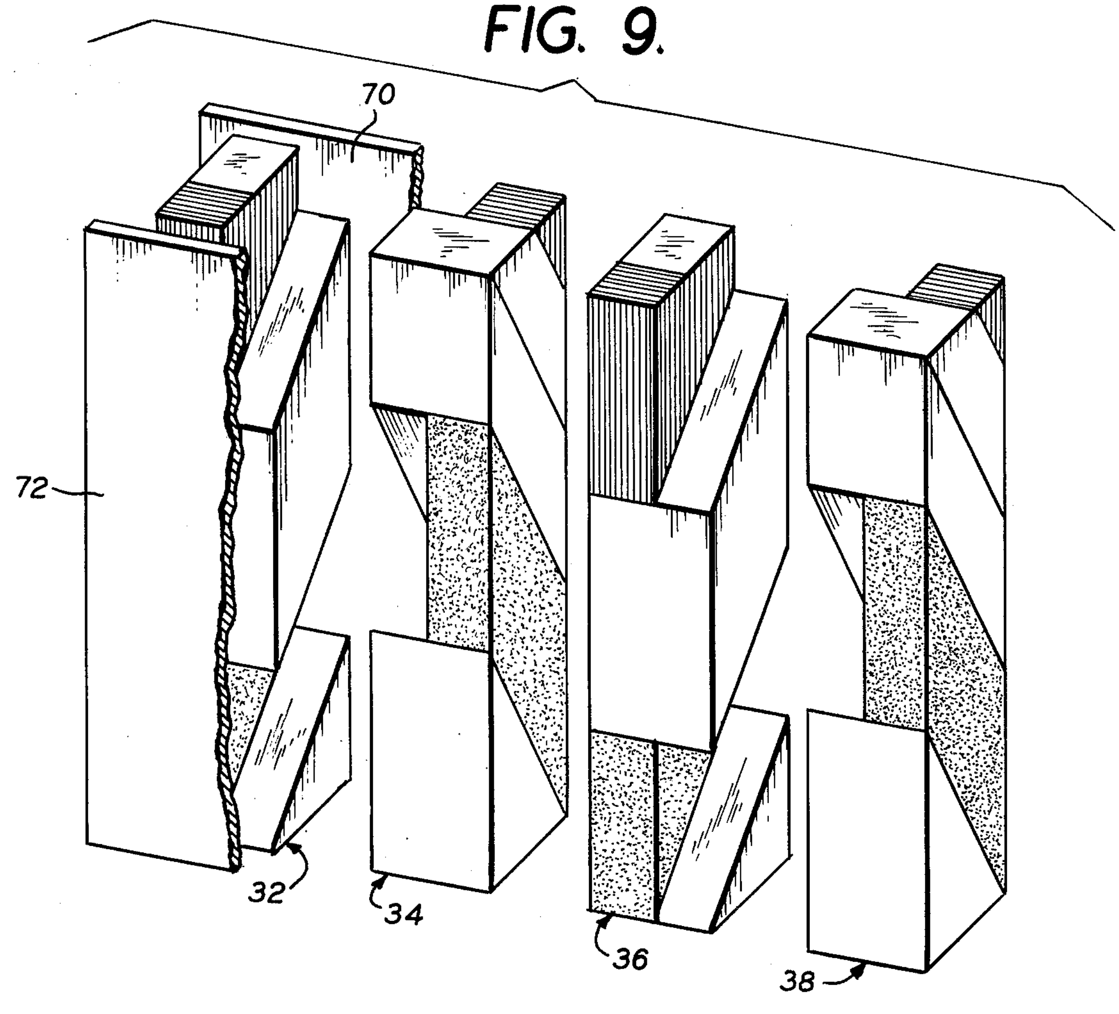
FIG. 9 is an exploded fragmentary perspective view of the embodiment illustrated in FIG. 8.

As shown and preferred in FIG. 4 and FIG. 9, which are exploded views, each of the batten-like members 32 to 38, respectively, is preferably identical in structure and configuration with the exception that adjacent batten-like members are rotated 180° about the respective longitudinal axis 50 so that for batten-like members 32 and 36, by way of example, the respective end faces *40e, 42f, 42e, 44f, 44e, 46f, 46e, 48f* form a predetermined acute angle 01, 02, 03 and 04, respectively (FIGS. 4 and 6) with the longitudinal axis 50 of the respective batten-like member 32 or 36 and with the angular through channels being alternately staggered at supplementary angles throughout the panel 30. Similarly, as shown in FIG. 4, preferably the alternate adjacent batten-like members 34 and 38, which are preferably identical, and the respective adjacent end faces *40e, 42f, 42e–44f, 44e–46f,* and *46e–48f* form a predetermined obtuse angle $B_1$, $B_2$, $B_3$ and $B_4$, respectively (FIG. 4), with the longitudinal axis 50, with the obtuse angle $B_1$ through $B_4$ being equal and being supplementary to the predetermined acute angle $0_1$, with $0_1$, through $0_4$ being equal. Preferably, $0_1$ forms a predetermined acute angle between 12° and 30° with the longitudinal axis 50 and most preferably, forms an angle of 18° with the longitudinal axis 50. Accordingly, $B_1$, which is preferably supplementary thereto, forms an obtuse angle in the range of 150° to 168° and most preferably forms an angle of 162° with the longitudinal axis 50. As shown and preferred in FIGS. 4 and 6, the angular through channels 39, 41, 43, 45, 47, 49, 51 and 53 in the various batten-like members 32, 34, 36 and 38 are respectively defined by the opposed end faces *40e* and *42e* and the respective adjacent side faces of adjacent batten-like member angular board segments for channels 39, 43, 47 and 51 and by the opposed end faces *44e* and *46e* and the respective adjacent side faces of adjacent batten-like member angular board segments for channels 41, 45, 49 and 53.

Preferably, each of the grained lumber segments 40 through 48, inclusive, has the grain thereof running in the same direction substantially parallel to the end surfaces *40e* for segment 40, *42e* for segment 42, *44e* for segment 44, *46e* for segment 46 and *48f* for segment 48. Accordingly, as shown and preferred in FIG. 4, when segments 32 and 34 are fastened together in the hardcore honeycomb panel 30, the respective grains thereof are cross-grained with the grain of member 32 running substantially at the acute angle of $\phi_1$ and the grain of member 34 running substantially at the obtuse angle of $B_1$. Similarly, the grain of member 34 is preferably cross-grained with the grain of member 38 comprising the hardcore honeycomb panel 30. If desired, however, all grains in a given batten-like member 32 through 38, need not run in the same direction from top surface to bottom surface although this is the presently most preferred embodiment.

Figure 8:
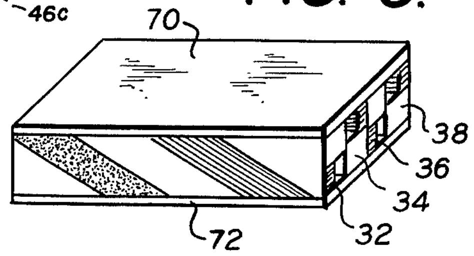
FIG. 8 is a perspective view of an alternative embodiment of the hardcore honeycomb panel of FIG. 7 such as for use in a door structure.

As shown and preferred in FIGS. 8 and 9, the hardcore honeycomb panel 30 may be utilized in conjunction with one or more veneer layers to form a filled structure such as a door. Two such layers 70 and 72, which are preferable such as for forming a door are shown by way of example in FIGS. 8 and 9, these layers 70, 72 having a predetermined thickness and being fastened, such as by means of gluing as discussed previously, to the top face, and bottom face respectively of the hardcore honeycomb panel 30 to cover or sandwich the hardcore honeycomb panel 30 in between the respective veneer layers 70 and 72 and form the filled door-like structure. Such a configuration may be readily utilized in construction, such as, by way of example, for a door, or for a wall if desired, in which instance, if it is an interior wall in which only one side is viewed, then only one veneer layer, such as veneer layer 70 need be provided. The hardcore honeycomb panel 30 provided in accordance with the above construction provides greater structural integrity than that normally provided by a composition such as press board, such as when the hardcore honeycomb panel 30 is utilized for construction such as doors but utilizes considerably less wood than required for the panel disclosed in my previous U.S. patent application, Ser. No. 465,493, filed Apr. 30, 1974 now U.S. Pat. No. 3,895, 144. It should be noted that if a strong material such as a plastic laminate is utilized in place of veneers 70 and 72, the channels 39, 41, 43, 45, 47, 49, 51 and 53 may be wider providing a lighter honeycomb panel 30 than if a fancy wood veneer requiring more structural support to prevent cracking or puncture were utilized.

METHOD

Figure 5:
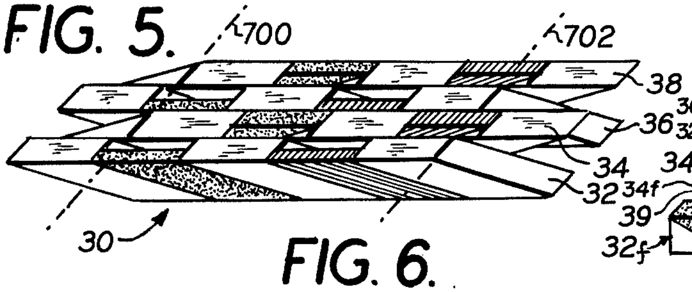
Figure 6:
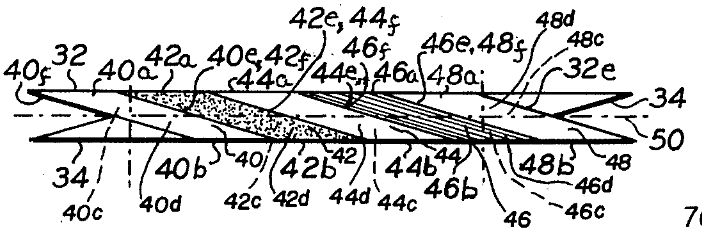

Referring now to FIGS. 1, 2, 3*a*, 3*b*, 3*c*, 3*d*, 4, 5, 6 and 7, the preferred method of the present invention for providing the hardcore honeycomb panel 30 illustrated in FIG. 7 shall be described. Referring now to FIG. 1, a plurality of grained lumber boards 480, 484 and 488, three such boards being shown by way of example in FIG. 1, and which are all preferably of the same width, such as board seasoned to about 7 percent and heart cut, are preferably stacked in step-wise fashion as illustrated in FIG. 1 and held spaced apart at different levels by grained lumber board strips 482*a*, *b*, *c* and *d* stacked between boards 480 and 484 and grained lumber board strips 486*a*, *b*, *c* and *d* stacked between boards 484 and 488. The strips 482*a*–482*d* and 486*a*–486*d* are preferably of substantially uniform width and of the same thickness *t* and longitudinal extent as boards 480, 484 and 488 and are spaced apart from adjacent strips in the respective levels 482 and 484 by a predetermined distance, such as preferably the width of a strip 486*a* by way of example to form longitudinal channels extending between the front and rear faces of the stack. The strips 482*a*–482*d* and 486*a*–486*d* are preferably the same width and the spacing between adjacent strips in a given level, as was previously mentioned, may be varied in size dependent on the desired weight and structural integrity for the resultant hardcore honeycomb panel 30, such as by using smaller spacing if a thin fine grade wood veneer is utilized for layers 70 and 72 in the arrangement of FIGS. 8 and 9 than if a plastic laminate were utilized in place thereof, the larger the size of the channels and the greater the number thereof, the lighter the resultant hardcore honeycomb panel 30 and the fewer the number and the smaller the size, the greater the structural integrity thereof. The boards 480, 484 and 488 may be of any desired width although preferably a width of 3 to 4 inches, designated by the letter W in FIG. 1, is provided, each board preferably having the thickness *t*, such as, by way of example, ½ of an inch. Preferably, as illustrated in FIG. 1, the boards 480, 484 and 488 and strips 492*a*–482*d* and 486*a*–486*d* are identical in thickness although this is not necessary in accordance with the present invention. Each of these boards and strips is preferably planar and is rectangular in configuration. The width W of the boards 480, 484 and 488 preferably should not exceed 8 inches. These boards are fastened or bonded together, such as with a waterproof resin, such as caseine glue or any other bonding adhesive such as thermoplastic or urea adhesives in conventional fashion, such as with a horizontal-action bonding press or with high-frequency heating. The number of boards and strips alternately bonded together level by level in the step-like stack is dependent on the length of the desired hardcore honeycomb panel 30 previously described; however, as shown and preferred boards 488 and 480 form the top and bottom surfaces, respectively, of the step-like stack. Preferably, these bonded boards and strips are planed true so that the bonded joint between adjacent boards is tight from layer to layer. Furthermore, the grain of each of the boards and strips comprising the step-like multilevel stack preferably runs in the same direction such as from front face 100 of board 488 to rear face 102 of board 488 in the direction of arrow 104 illustrated in FIG. 1, the grain of boards 480 and 484 and strips 482*a*–482*d* and 486*a*–486*d* preferably being substantially parallel therewith. If desired, however, different grain directions may be utilized for the various boards and strips comprising the stack. In fastening or bonding the various boards and strips together in the stack having alternate levels of boards and strips as illustrated in FIG. 1, the stack may be placed in a conventional horizontal action bonding press and subjected to a predetermined pressure, such as 5 kilograms per square centimeter for the required pressing time of between one and two hours depending on the kind of adhesive. If desired, the stack may be taken out of the press before this time and kept under pressure thereafter with conventional clamping means. After a predetermined period of time, the stack may be cut such as with gang or band saws followed by drying out of the moisture introduced by the adhesive. As shown and preferred in FIG. 1, each of the boards and strips in the stack has a front face 100, 106, 108, respectively for boards 488, 484 and 480, and 110*a*, 110*b*, 110*c* and 110*d* for strips 486*a*, 486*b*, 486*c* and 486*d*, respectively, and 112*a*, 112*b*, 112*c* and 112*d* for strips 482*a*, 482*b*, 482*c*, 482*d*; a rear face 102, 116 and 120, respectively, for boards 488, 484 and 480, and 114*a*–*d* for strips 486*a*–*d* respectively, and 118*a*–*d* for strips 482*a*–*d* respectively, a top face 122, 126 and 128 respectively for boards 488, 484 and 480 and 124*a*–*d*, respectively, an opposed bottom face 130, 132 and 134 for boards 488, 484 and 480, respecitvely and 136*a*–*d* for strips 486*a*–*d* respecitvely, and 138*a*–*d* for strips 482*a*–*d*, respectively; and a pair of side faces 140 and 142 for board 488, 144 and 146 for board 484, 148 and 150 for board 480, 152*a* and 154*a* for strip 486*b*, 152*c* and 154*c* for strip 486*c*, 152*d* and 154*d* for strip 486*d*, 156*a* and 158*a* for strip 482*a*, 156*b* and 158*b* for strip 482*b*, 156*c* and 158*c* for strip 482*c* and 156*d* for strip 482*d*. The stack, generally referred to by the reference numeral 800, is preferably initially completely cut along a first cut line, 500 by way of example, at a predetermined acute angle $\phi_1$, such as preferably between 12° and 30° and most preferably 18°, between the cut line 500 and the bottom face 134 of the stack 800. As used hereinafter throughout the specification and claims, the term "cut line" is not meant to refer to a predetermined line marked on the surface but rather is meant to include a direction of cutting for the saw utilized, such as a conventional gang or band saw. With respect to the first cut along cut line 500, the pieces of lumber illustrated by cross hatching in FIG. 2 are preferably discarded as waste so as to provide a smooth continuous planar sloped surface having channel openings wherein as shown in FIG. 3*c* for the front surface of the stack 800 which slope has an acute angle $\phi_1$. Thereafter, the stack 800 is preferably cut along a plurality of spaced apart cut lines 502, 504, 506, 508 and 510, illustrated in FIG. 2, by way of example, at predetermined acute angles $\phi_2$, $\phi_3$, $\phi_4$, $\phi_5$ and $\phi_6$ which all preferably form the same angle between the respective cut line and the bottom face 134 on the stack, to provide a plurality of parallel sloping surfaces, these cuts preferably being completely through from one side face to the other side face of the stack to provide a plurality of substantially identical cut segments 600, 602, 604, 606 and 608 by way of example, the portion of the cut stack indicated by cross hatching between cut line 510 and the rear face of the stack 800 also preferably being discarded as waste material to provide a smooth planar sloping rear surface having channel openings therein as shown in FIG. 3*c* for the stack. These cut segments 600 to 608 are now preferably separable from each other and, as shown in FIGS. 3*a*, 3*b*, and 3*d*, each preferably comprise a pair of side faces which are rhomboidal in configuration as illustrated in FIG. 3*b* whereas the top, bottom, front and rear faces thereof are rectangular in configuration, as illustrated in FIGS. 3*a* and 3*d*, with the front and rear surfaces having channel openings therein, a typical one of these cut portions 600 being illustrated in FIG. 3*c*. The cut portion 600, by way of example, is then preferably cut into a plurality of identical segments 620, 622, 624 and 626, four such segments being shown by way of example in FIG. 3*c* along a line normal to the bottom face 134 to provide a plurality of batten-like members, such as members 32, 34, 36 and 38 previously described with reference to FIG. 7. It should be noted, as shown in FIGS. 3*c* and 4, these normal cut lines should not coincide with the extents of the channel openings and preferably provide angular channel grooves in the batten-like members which when assembled as in FIGS. 5 and 7 form interior angular through channels 39, 41, 43, 45, 47, 49, 51 and 53. For purposes of explanation, it shall be assumed that segments 620, 622, 624 and 626 correspond, respectively, to previously described batten-like members 32, 34, 36 and 38, respectively. Each of these batten-like members is preferably identical in configuration. As illustrated in FIG. 4, and as previously described, alternate batten-like members are preferably rotated 180° about the longitudinal axis 50 as that the end faces of the adjacent batten-like members which are preferably fastened or bonded together in the same fashion previously described with reference to the bonding of the boards comprising the stack 800, with the end faces of member 32, which corresponds to segment 620 and 34, which corresponds to segment 622 providing cross graining due to the acute angle $\phi_1$ being formed between the end faces of batten-like member 32 and the longitudinal axis 50, and the obtuse angle $B_1$ which is supplementary thereto being formed between the longitudinal axis 50 of member 34 and the end faces thereof, the same being true with respect to members 36 and 38 as previously described. This fastened configuration of batten-like members is allowed to dry for sufficient time, such as 24 hours, and the ends thereof are preferably cut, such as along cut lines 700 and 702 as illustrated in FIG. 5, from side face to side face of the hardcore honeycomb panel 30 as to provide a rectangular hardcore honeycomb panel as illustrated in FIG. 7. FIG. 6 illustrates the location of this cutting, by way of example, in side elevation, in which the ends are squared off for the hardcore honeycomb panel 30. Preferably, the spacing between the diagonal cut lines or planes is ⅞ of an inch, such spacing depending on the desired thickness of the final hardcore honeycomb panel 30. Furthermore, as is readily apparent from the figures, the length of the final hardcore honeycomb panel 30 which preferably comprises one batten-like member in length is determined by the height or number of boards in the stack 800.

It is to be understood that the above described embodiments of the invention are merely illustrative of the principles thereof and that numerous modifications and embodiments of the invention may be derived within the spirit and scope thereof.

What is claimed is:

1. A method of making a hardcore panel comprising the steps of providing a stack of predetermined width comprising a first plurality of parallel substantially uniform first width planar boards of grained lumber and a second plurality of parallel planar boards of grained lumber having a second substantially uniform width less than said first width with said first and second plurality of boards being fastened together and arranged in said stack in step-wise fashion in a plurality of levels with said first width being substantially equivalent to said stack width, said stack having opposed top and bottom parallel faces, opposed front and rear faces and a pair of opposed parallel side faces, with the top and bottom faces and side faces being substantially planar and the front and rear faces being stepped from said bottom to said top face, said first width planar boards comprising said bottom and said top faces of said stack, said bottom face comprising the bottom level of said stack and said top face comprising the top level of said stack with said second plurality of planar boards being arranged in alternate levels with said first plurality of boards in said stack and with each of said alternate levels comprised of said second plurality of boards being comprised of at least a pair of substantially uniformly spaced apart second width planar boards forming a longitudinally extending channel in said stack; initially completely cutting said stepped stack along a first cut line through said faces from said face to side face at a predetermined acute angle between said first cut line and said bottom face to provide a substantially planar front face normal to said first cut line, said front face being sloped between said parallel planar top and bottom faces at said acute angle with respect to the plane of said bottom face; completely cutting said initially cut stepped stack at a predetermined distance from said first cut line along said side face along a second cut line through said side faces from side face to side face at said predetermined acute angle between said second cut line and said bottom face to provide a first cut portion from said stepped stack having a substantially planar rear face for said first cut portion normal to said second cut line, said first cut portion front and rear faces being parallel completely cutting said first cut portion through said first cut portion front face from said first cut portion front face to said first cut portion rear face along a third cut line normal to said bottom face to provide a first plurality of substantially identical cut segments each having said first cut portion sloping front and rear faces and whose top, front, bottom and rear faces are rectangular and whose side faces are rhomboidal, each of said first plurality of cut segments comprising said stack between said top and bottom faces with the top and bottom faces of each board in said stack being parallel to said cut segment top and bottom faces; and fastening said cut segments together with said front faces in a common plane with alternate adjacent fastened segments being rotated 180° about a longitudinal axis through the center of said segment parallel to said front face slope to provide a top and bottom surface for said fastened segments comprising alternating inverted sloping surfaces of said segment top and bottom faces whose slope is at an angle supplementary to said acute angle to provide said panel with a portion of said sloping surfaces defining sloping channels in said panel, whereby a honeycomb hardwood panel is provided.

2. A method in accordance with claim 1 wherein each of said pairs of substantially uniformly spaced apart second width planar boards are substantially uniformly spaced apart by at least a distance equivalent to said second width for forming said channel.

3. A method in accordance with claim 1 wherein one of said stack side faces comprises at least one of said second width planar boards comprising each of said alternate levels and the other of said stack side faces comprises at least another one of said second width planar boards comprising each of said alternate levels.

4. A method in accordance with claim 1 further comprising the steps of completely cutting said first cut portion through said first cut portion front face from said first cut portion front face to said first cut portion rear face along a fourth cut line substantially parallel to said first cut line and spaced thereapart by a sufficient distance to provide said plurality of substantially identically cut segments with said third and fourth cut lines not coinciding with said channel width extents.

5. A method in accordance with claim 1 further comprising the steps of cutting said alternating inverted sloping surfaces of said fastened segments along a fourth cut line normal to said segment front face and a fifth cut line normal to said segment rear face to provide substantially planar top and bottom faces for said panel comprising said fastened segments which are parallel to each other and normal to said front and rear and side faces wherein the side faces of the component boards are at an angle to said bottom face supplementary to said acute angle.

6. A method in accordance with claim 1 wherein said acute angle is substantially between 12° and 30°.

7. A method in accordance with claim 1 wherein said acute angle is substantially 18°.

8. A method in accordance with claim 1 wherein said stack providing step comprises the step of fastening said stack together by gluing adjacent boards to each other with a waterproof resin.

9. A method in accordance with claim 1 wherein said segment fastening step comprises the step of fastening adjacent side surfaces of said cut segments to each other by gluing with a waterproof resin.

10. A method in accordance with claim 1 wherein said stack providing step comprises the further step of stacking said plurality of boards with the grains thereof all running in the same direction.

11. A method in accordance with claim 10 wherein said stack providing further step comprises stacking said plurality of boards with the grains thereof all running in the direction between said front and rear faces of said boards in said stack.

12. A method in accordance with claim 1 comprising the further step of fastening a veneer layer of a predetermined thickness to at least said front face of said honeycomb panel to cover said front face.

13. A method in accordance with claim 12 wherein said veneer layer fastening step comprises fastening another veneer layer of a predetermined thickness to said rear face of said panel to cover said rear face, said honeycomb panel being sandwiched between said veneer layers.

14. A hardcore panel comprising a plurality of adjacent batten-like members fastened together in a substantially planar configuration, each of said batten-like members having a top face, an opposed bottom face, a pair of opposed side faces, each of said faces being substantially normal to the adjacent face of said batten-like member, each of said batten-like members comprising a fastened plurality of stacked adjacent board segments of grained lumber, each of said segments having a top face, an opposed bottom face, a pair of opposed end faces and a pair of opposed side faces, said board segments being stacked along the longitudinal axis of said batten-like member from one of said batten-like member end faces to said opposed end face, at least a portion of said board segments defining a channel therethrough, said adjacent board segment end faces being fastened together and being substantially parallel to each other, said adjacent board segments top, bottom and side faces comprising said batten-like member top, bottom and side faces respectively, each of said segment adjacent end faces for every other one of said fastened batten-like members in said plurality forming a predetermined acute angle with said longitudinal axis, each of said adjacent end faces comprising said batten-like members adjacent to said every other one in said plurality forming a predetermined obtuse angle with said longitudinal axis which is supplementary to said predetermined acute angle, whereby a honeycomb panel is provided.

15. A hardcore panel in accordance with claim 14 wherein the grain of each of said segments comprising a given batten-like member all run in the same direction between said top surface and said bottom surface with the direction of the grain of each of said obtuse angular related segments substantially being supplementary to the direction of the grain of each of said acute angular related segments.

16. A hardcore panel in accordance with claim 15 wherein said grain runs in a direction substantially coplanar with said segment end faces.

17. A hardcore panel in accordance with claim 14 wherein said acute angle is substantially between 12° and 30°.

18. A hardcore panel in accordance with claim 14 wherein said acute angle is substantially 18°.

19. A hardcore panel in accordance with claim 14 further comprising a veneer layer having a predetermined thickness fastened to at least said top face of said honeycomb panel to cover said top face.

20. A hardcore panel in accordance with claim 19 further comprising a second veneer layer having a predetermined thickness fastened to said bottom face of said panel to cover said bottom face, said honeycomb panel being sandwiched between said veneer layers.

* * * * *